United States Patent
Yamamoto (10) Patent No.: US 9,428,218 B2
(45) Date of Patent: Aug. 30, 2016

(54) STEERING DEVICE (71) Applicant: JTEKT CORPORATION, Osaka, Osaka (JP)

(72) Inventor: Yasuharu Yamamoto, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/667,308

(22) Filed: Mar. 24, 2015

(65) Prior Publication Data

US 2015/0284019 A1 Oct. 8, 2015

(30) Foreign Application Priority Data

Apr. 7, 2014 (JP) ................. 2014-078837

(51) Int. Cl.
*B62D 5/04* (2006.01)
*F16K 15/14* (2006.01)

(52) U.S. Cl.
CPC ............... *B62D 5/0424* (2013.01); *B62D 5/04* (2013.01); *F16K 15/148* (2013.01)

(58) Field of Classification Search
CPC ...... B62D 5/0424; B62D 5/04; F16K 15/148
See application file for complete search history.

(56) References Cited

U.S. PATENT DOCUMENTS 8,881,861 B2 * 11/2014 Tojo ..................... B62D 5/0424
180/444
9,227,656 B2 * 1/2016 Tojo ..................... B62D 5/0424

2009/0133485 A1 5/2009 Bareis et al.
2012/0152645 A1 6/2012 Matthias
2013/0306396 A1 11/2013 Tojo
2014/0007738 A1 1/2014 Froehlich

FOREIGN PATENT DOCUMENTS

DE 102006006679 A1 4/2007
DE 10 2009 039 832 B3 1/2011
EP 2473767 A2 7/2012

OTHER PUBLICATIONS

Apr. 18, 2016 Search Report issued in European Patent Application No. 15161185.2.

* cited by examiner

*Primary Examiner* — Joseph Rocca
*Assistant Examiner* — Marlon A Arce
(74) *Attorney, Agent, or Firm* — Oliff PLC (57) ABSTRACT

A rack-parallel electric power steering device includes a housing that covers the periphery of a speed reducer, and a drain valve provided in the housing. The drain valve includes a first case, a second case mounted to the outer peripheral portion of a bottom portion of the first case, and a valve element that closely contacts a bottom surface of the first case. A through hole is formed in the bottom portion of the first case. The second case includes a bottom portion which is disposed with a gap from the bottom portion of the first case and in which discharge holes are formed. The valve element is an elastic member that blocks an opening portion of the through hole of the first case and that is held between the first case and the second case.

9 Claims, 7 Drawing Sheets

EXTENDING DIRECTION

EXTENDING DIRECTION

FIG.11

STEERING DEVICE

INCORPORATION BY REFERENCE

The disclosure of Japanese Patent Application No. 2014-078837 filed on Apr. 7, 2014 including the specification, drawings and abstract, is incorporated herein by reference in its entirety.

BACKGROUND OF THE INVENTION

1. Field of the Invention

The present invention relates to a steering device.

2. Description of the Related Art

A rack-parallel electric power steering device is known as one type of steering devices for vehicles. The rack-parallel electric power steering device includes a ball screw device attached to the outer periphery of a rack shaft, a motor with an output shaft disposed in parallel with the rack shaft, and a speed reducer that couples the output shaft of the motor and the ball screw device to each other. The periphery of the speed reducer is covered by a housing.

In the rack-parallel electric power steering device, when water enters the housing from the outside and the water resides in the housing, the speed reducer may be flooded with the water. When the water in the housing is frozen with the speed reducer flooded with water, operation of the speed reducer is hindered. When operation of the rack shaft coupled to the speed reducer via the ball screw device is hindered, a steering feel may be deteriorated by a heavy steering operation or the like. Thus, there has hitherto been known a steering device in which a drain valve is provided at a bottom wall portion of a housing under a speed reducer in the vertical direction in order to discharge water having entered the housing. An example of such a drain valve is described in German Patent Application Publication No. 10 2009 039 832.

Figure 11:
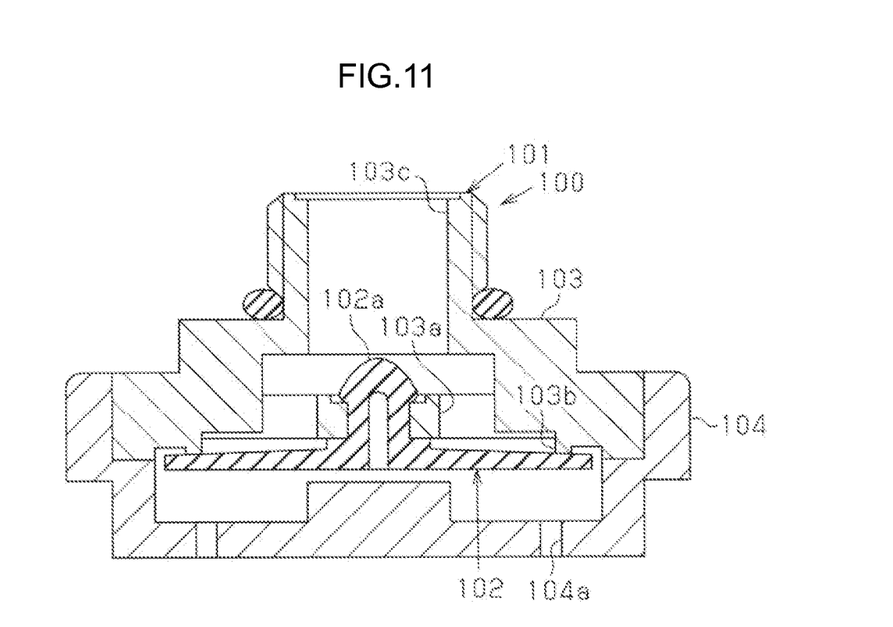
FIG. 11 is a sectional view illustrating a sectional structure of a drain valve according to the related art.

As illustrated in FIG. 11, a drain valve 100 described in German Patent Application Publication No. 10 2009 039 832 includes a case body 101 in a bottomed cylindrical shape, and a valve element 102 housed inside the case body 101. The case body 101 is structured such that a second case 104 in a bottomed cylindrical shape is assembled to an end portion of a cylindrical first case 103. A cylindrical attachment portion 103a is formed at the center portion of an opening portion of the first case 103 on the second case 104 side. A valve seat 103b which is an annular projecting portion is formed at an end surface of the first case 103 on the second case 104 side. A discharge hole 104a that penetrates from the inside to the outside is formed in the bottom portion of the second case 104. The valve element 102 is a disc-shaped elastic member. A projecting portion 102a is formed at the center portion of the valve element 102. The projecting portion 102a engages with the attachment portion 103a of the first case 103 so that the valve element 102 is fixed with respect to the first case 103. The peripheral edge portion of the valve element 102 closely contacts the valve seat 103b of the first case 103. In the drain valve 100, water having entered a housing (not illustrated) flows into the first case 103 through an opening portion 103c of the first case 103, and is discharged to the outside of the housing via the valve element 102 and the discharge hole 104a. In the case where water enters the second case 104 from the outside of the housing via the discharge hole 104a, on the other hand, the valve element 102 suppresses inflow of the water into the housing.

In the drain valve 100 described in German Patent Application Publication No. 10 2009 039 832, in order to fix the valve element 102 to the first case 103, it is necessary to form the first case 103 with the attachment portion 103a, and form the valve element 102 with the projecting portion 102a. This incurs complication of the structure of the drain valve 100.

SUMMARY OF THE INVENTION

It is an object of the present invention to provide a steering device capable of suppressing inflow of water from the outside of a housing while enabling discharge of water from the inside of the housing with a simple structure.

An aspect of the present invention provides a steering device including: a steered shaft that moves in an axial direction on the basis of rotation of a steering shaft to steer steered wheels; a motor that applies an assist force to the steered shaft via a speed reducer; and a housing that covers a periphery of the speed reducer. A drain valve is provided at a bottom wall portion of the housing under the speed reducer in a vertical direction. The drain valve includes: a first case that opens into the housing and that has a bottomed cylindrical shape having a bottom portion in which a through hole is formed; a second case that is mounted to an outer peripheral portion of the bottom portion of the first case and that has a bottomed cylindrical shape having a bottom portion which is disposed with a gap from the bottom portion of the first case and in which a discharge hole is formed; and a valve element formed of an elastic member that closely contacts a bottom surface of the first case to block an opening portion of the through hole and that is held between the first case and the second case.

According to the configuration, water having entered the housing flows into the first case through the opening portion of the first case, and resides on the bottom portion of the first case. The water residing on the bottom portion of the first case contacts the valve element through the through hole formed in the bottom portion. When a certain amount of water or more resides on the bottom portion of the first case, the valve element is elastically deformed by the weight of the water. Consequently, water that resides inside the first case flows into the second case through a gap between the valve element and the bottom surface of the first case, and is discharged to the outside through the discharge hole of the second case. Thus, water having entered the housing can be discharged to the outside.

In the case where water outside the housing enters the second case via the discharge hole, meanwhile, the valve element is pressed in the direction in which the valve element closely contacts the bottom surface of the first case. The valve element is maintained in a state in which the valve element closely contacts the bottom surface of the first case. Therefore, entry of water into the housing from the outside of the housing via the drain valve can be suppressed.

According to the drain valve described above, water can be discharged from the inside of the housing, and on the other hand, inflow of water from the outside of the housing can be suppressed. In addition, the valve element is held between the first case and the second case to be fixed. Therefore, it is not necessary to form the valve element and the cases with a structure for fixing the valve element as in the drain valve described in German Patent Application Publication No. 10 2009 039 832. Therefore, the structure can be simplified.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering device according to an embodiment will be described below. The steering device according to the embodiment is a rack-parallel electric power steering device.

Figure 1:
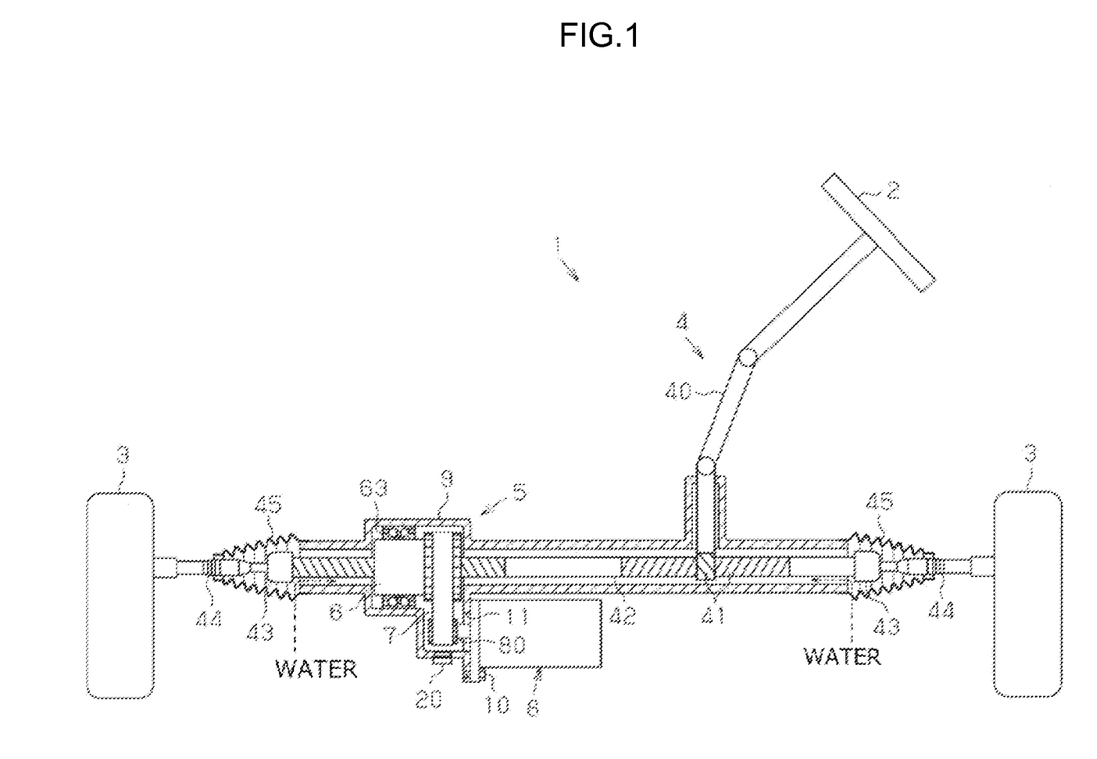
FIG. 1 is a sectional view illustrating a schematic structure of a steering device according to an embodiment.

As illustrated in FIG. 1, a steering device 1 includes a steering mechanism 4 that steers steered wheels 3 on the basis of an operation of a steering wheel 2 performed by a driver, and an assist mechanism 5 that assists the driver in performing a steering operation.

The steering mechanism 4 includes a steering shaft 40 that serves as a rotary shaft of the steering wheel 2, and a rack shaft 42 coupled to the lower end portion of the steering shaft 40 via a rack-and-pinion mechanism 41. In the embodiment, the rack shaft 42 corresponds to the steered shaft. Tie rods 44 are rotatably connected to both ends of the rack shaft 42 via ball joints 43. The steered wheels 3 are coupled to the distal ends of the tie rods 44. With the steering mechanism 4, when the steering shaft 40 is rotated along with an operation of the steering wheel 2 performed by the driver, rotational motion of the steering shaft 40 is converted into reciprocal linear motion of the rack shaft 42 in the axial direction via the rack-and-pinion mechanism 41. Reciprocal linear motion of the rack shaft 42 in the axial direction is transmitted to the tie rods 44 via the ball joints 43 to vary the steering angle of the steered wheels 3 to change the advancing direction of the vehicle.

The assist mechanism 5 is provided to the rack shaft 42. The assist mechanism 5 is composed of a ball screw device 6, a speed reducer 7, and a motor 8. The ball screw device 6, the speed reducer 7, and the rack shaft 42 are covered by a housing 9. The motor 8 is fixed to the outer wall of the housing 9 by a bolt 10 so that an output shaft 80 of the motor 8 is disposed in parallel with the rack shaft 42. The output shaft 80 of the motor 8 extends into the housing 9 through a through hole 11 formed in the housing 9. Bellows 45 are attached between both end portions of the housing 9 in the axial direction of the rack shaft 42 and the tie rods 44. The bellows 45 block opening portions at both ends of the housing 9 to suppress entry of foreign matter into the housing 9 from the outside.

The configuration of the ball screw device 6 and the speed reducer 7 will be described with reference to FIG. 2.

Figure 2:
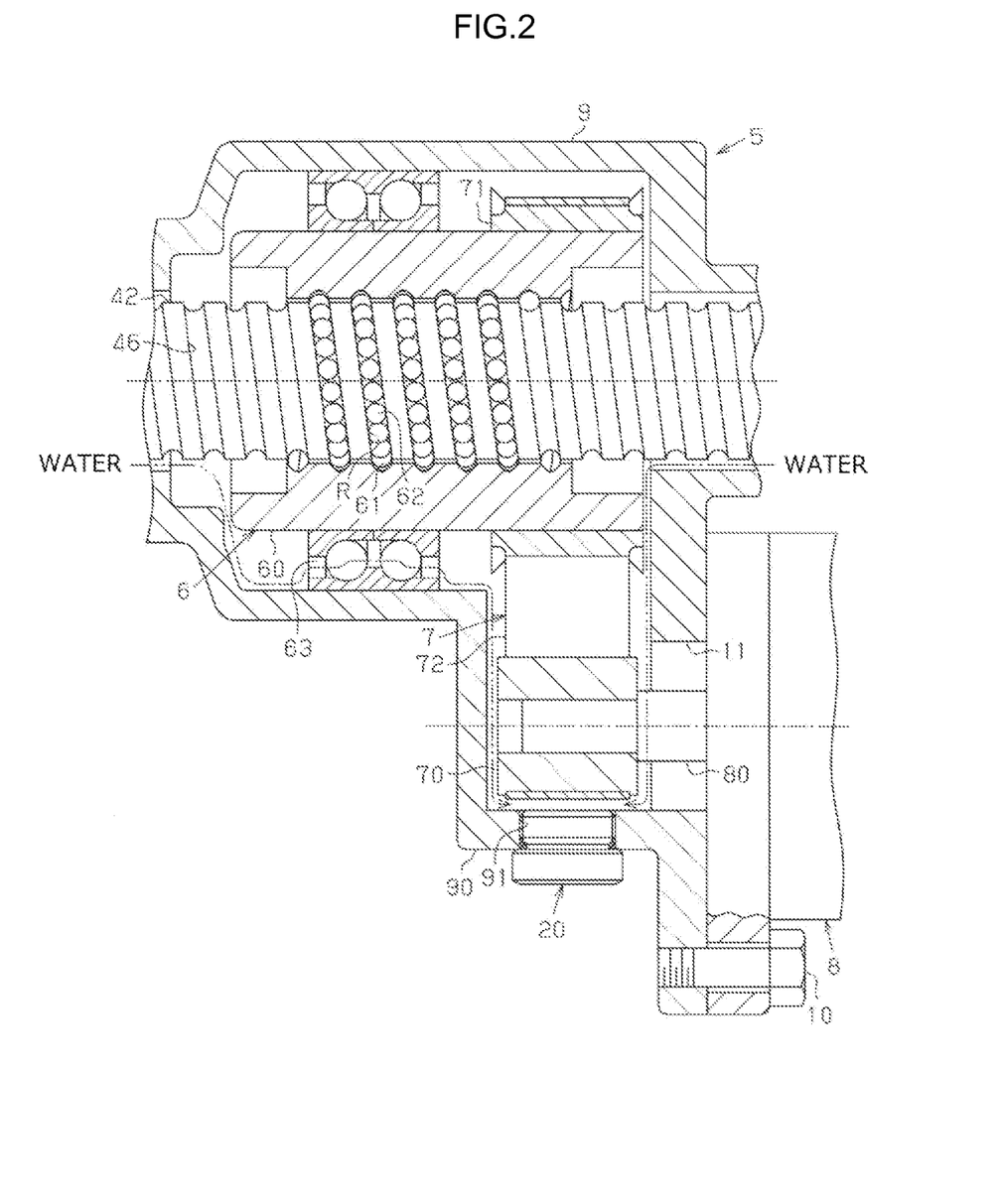
FIG. 2 is a sectional view illustrating the sectional structure around an assist mechanism of the steering device according to the embodiment.

As illustrated in FIG. 2, a spiral screw groove 46 is formed in the outer peripheral surface of the rack shaft 42. The ball screw device 6 includes a cylindrical nut 60 threadably engaged with the screw groove 46 via a plurality of balls 62 with the rack shaft 42 serving as a screw shaft. The nut 60 is supported by a bearing 63 so as to be rotatable with respect to the housing 9. A spiral screw groove 61 that faces the screw groove 46 of the rack shaft 42 is formed in the inner peripheral surface of the nut 60. A rolling passage R in which the balls 62 roll is formed by a spiral space surrounded by the screw groove 61 of the nut 60 and the screw groove 46 of the rack shaft 42. A circulation passage (not illustrated) that short-circuits two locations of the rolling passage R is formed in the nut 60. Thus, the balls 62 can endlessly circulate in the rolling passage R via the circulation passage in the nut 60.

The speed reducer 7 includes a driving pulley 70 integrally attached to the output shaft 80 of the motor 8, a driven pulley 71 integrally attached to the outer periphery of the nut 60, and a belt 72 wound around the pulleys 70, 71.

In the thus configured assist mechanism 5, when the output shaft 80 of the motor 8 rotates, the driving pulley 70 rotates together with the output shaft 80 of the motor 8. The driving pulley 70 integrally rotates the driven pulley 71 and the nut 60 via the belt 72. In this event, the ball screw device 6 is driven on the basis of torque applied to the nut 60. When the nut 60 relatively rotates with respect to the rack shaft 42, the balls 62 receive a load from the nut 60 and the rack shaft 42 to endlessly circulate in the rolling passage R. Through endless circulation of the balls 62, torque applied to the nut 60 is transmitted to the rack shaft 42 to relatively move the rack shaft 42 with respect to the nut 60 in the axial direction. A force in the axial direction is applied to the rack shaft 42. The force in the axial direction applied to the rack shaft 42 serves as an assist force to assist a driver in performing a steering operation.

An attachment hole 91 that penetrates from the inner surface to the outer surface is formed in a bottom wall portion 90 of the housing 9 under the speed reducer 7 in the vertical direction. The attachment hole 91 has female threads. A drain valve 20 is threadably attached to the attachment hole 91.

Figure 3:
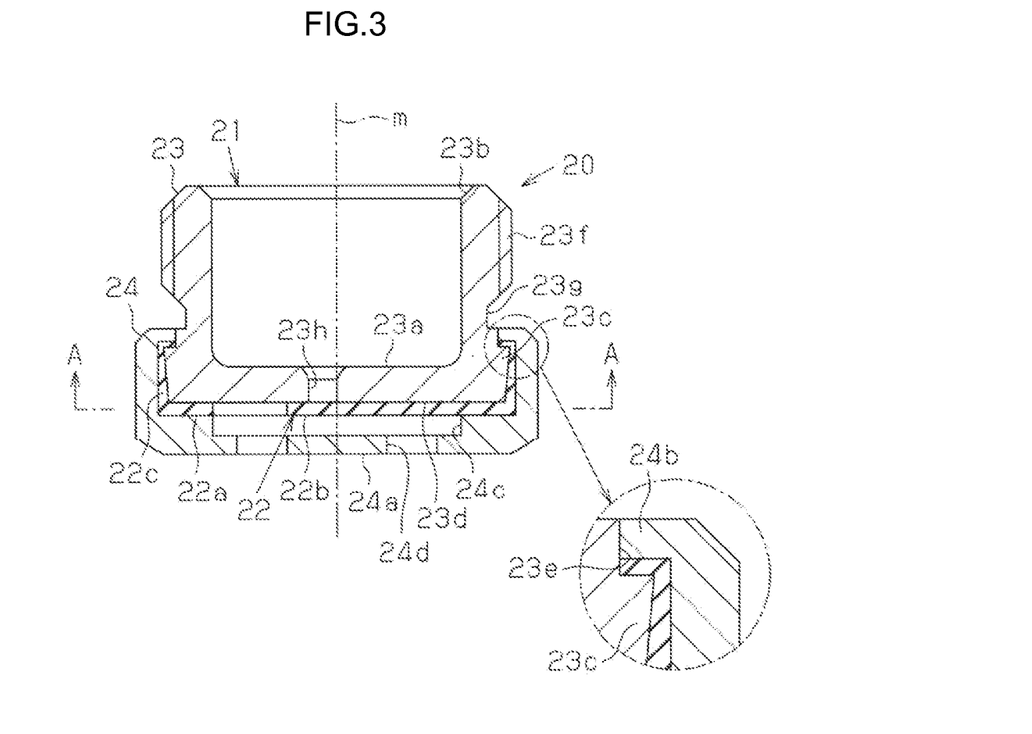
FIG. 3 is a sectional view illustrating a sectional structure of a drain valve of the steering device according to the embodiment.

The configuration of the drain valve 20 will be described with reference to FIGS. 3 to 7. FIG. 3 illustrates a sectional structure of the drain valve 20.

As illustrated in FIG. 3, the drain valve 20 includes a case body 21 formed in a bottomed cylindrical shape about an axis m, and a valve element 22 housed inside the case body 21. The case body 21 is formed by mounting a second case 24 in a bottomed cylindrical shape to the outer peripheral portion of a bottom portion 23a of a first case 23 in a bottomed cylindrical shape, and has a double-bottom structure.

Figure 4:
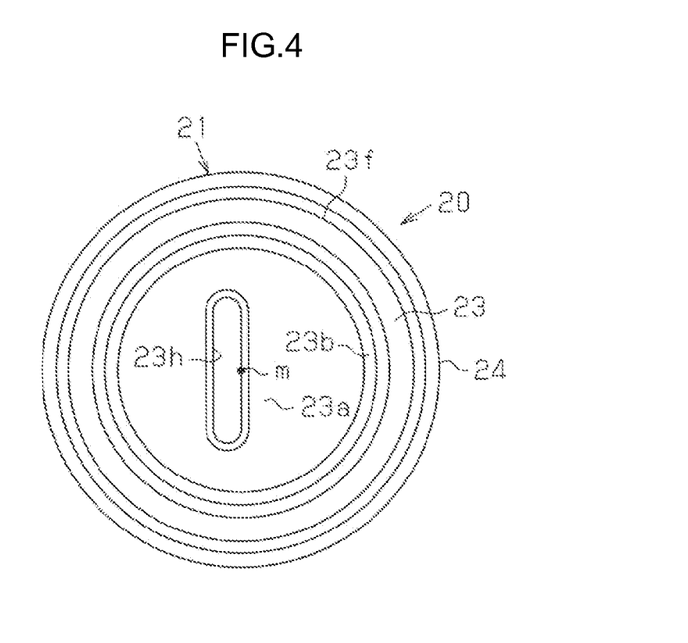
FIG. 4 is a plan view illustrating a planar structure of the drain valve according to the embodiment.

A flange portion 23c is formed at the outer peripheral portion of the bottom portion 23a of the first case 23. The flange portion 23c is formed so as to become smaller in outside diameter toward a bottom surface 23d of the first case 23. That is, the outer peripheral surface of the flange portion 23c is formed in a tapered shape. As illustrated in the drawing as enlarged, a notch 23e is formed at an end portion of the outer peripheral surface of the flange portion 23c on the opposite side of the first case 23 from the bottom surface 23d. A screw groove 23f is formed in the outer peripheral surface of a tubular portion of the first case 23. A ring groove 23g is formed between the screw groove 23f and the flange portion 23c. A through hole 23h that penetrates from the inner surface to the outer surface is formed in the bottom portion 23a of the first case 23 at a position offset from the center portion. As illustrated in FIG. 4 which illustrates a planar structure of the drain valve 20 seem from an opening portion 23b of the first case 23, the through hole 23h is formed in a long hole shape. The internal space of the first case 23 and the internal space of the second case 24 communicate with each other through the through hole 23h.

Figure 5:
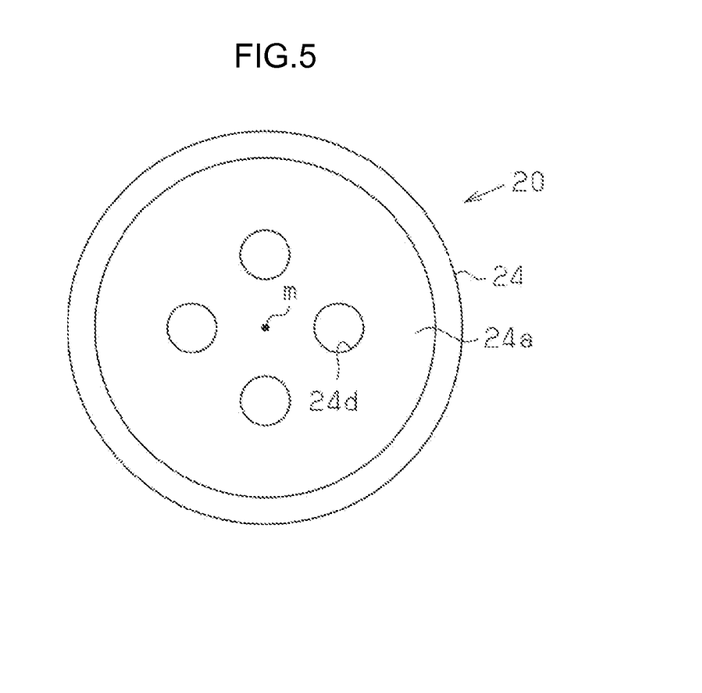
FIG. 5 is a bottom view illustrating a bottom surface structure of the drain valve according to the embodiment.

As illustrated in FIG. 3 as enlarged, an annular hook portion 24b that projects inward is formed at the opening portion of the second case 24. The hook portion 24b engages with the notch 23e of the flange portion 23c of the first case 23. The second case 24 is assembled to the first case 23 through the engagement structure. A bottom portion 24a of the second case 24 is disposed with a gap from the bottom portion 23a of the first case 23. An annular stepped portion 24c that projects toward the bottom surface 23d of the first case 23 is formed at the peripheral edge portion of the inner surface of the bottom portion 24a of the second case 24. Discharge holes 24d that penetrate from the inner surface to the outer surface are formed in the bottom portion 24a of the second case 24. As illustrated in FIG. 5 which illustrates the structure of the drain valve 20 seen from the bottom portion 24a side of the second case 24, the discharge holes 24d are disposed about the center axis m of the second case 24.

Figure 6:
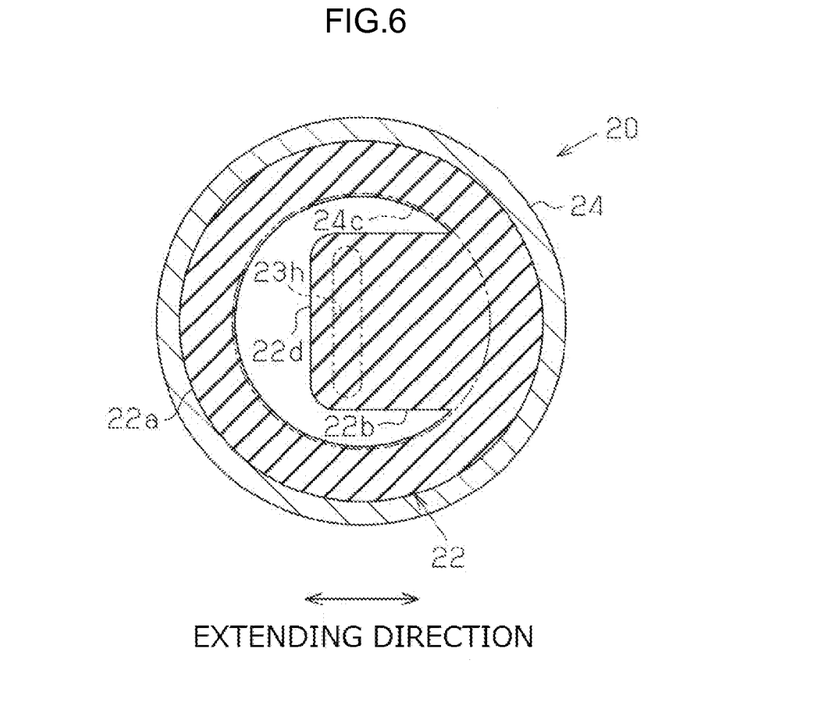
FIG. 6 is a cross-sectional view illustrating a cross-sectional structure taken along the line A-A of FIG. 3.

As illustrated in FIG. 3, the valve element 22 is disposed so as to closely contact the bottom surface 23d of the first case 23. The valve element 22 is an elastic member made of rubber, a resin, or the like. As illustrated in FIG. 6 which illustrates a cross-sectional structure taken along the line A-A of FIG. 3, the valve element 22 includes an annular portion 22a and a blocking piece 22b formed to extend from the inner peripheral surface of the annular portion 22a. As illustrated in FIG. 3, the annular portion 22a is disposed along the peripheral edge of the bottom surface 23d of the first case 23. The blocking piece 22b is formed to extend from a location on the inner peripheral surface of the annular portion 22a that is the most distant from the through hole 23h of the first case 23 to the through hole 23h, and blocks the opening portion of the through hole 23h. Consequently, the internal space of the first case 23 and the internal space of the second case 24 are separated by the blocking piece 22b. The annular portion 22a is held between the bottom surface 23d of the first case 23 and the stepped portion 24c of the second case 24. Consequently, the valve element 22 is fixed. A tubular portion 22c formed in a tubular shape about the axis m is formed at the outer edge of the annular portion 22a of the valve element 22. The tubular portion 22c is disposed along the outer peripheral surface of the flange portion 23c of the first case 23 and the notch 23e of the flange portion 23c, and held between the outer peripheral surface of the first case 23 and the inner peripheral surface of the second case 24.

Figure 7:
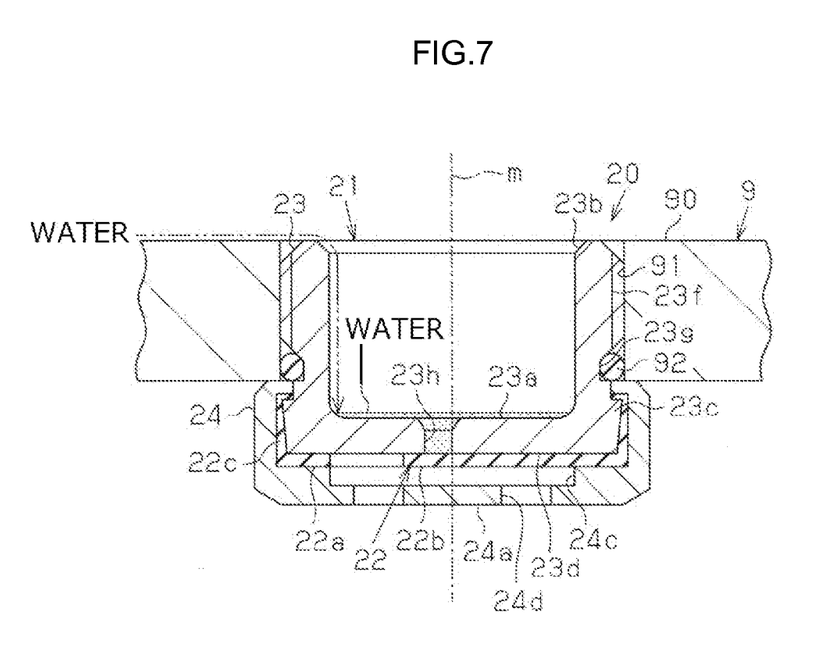
FIG. 7 is a sectional view illustrating a state in which the drain valve according to the embodiment is attached to a housing.

As illustrated in FIG. 7, the drain valve 20 is fixed to the housing 9 with the screw groove 23f of the first case 23 threadably engaged with the attachment hole 91 of the housing 9. A seal ring 92 is fitted in the ring groove 23g of the first case 23. The seal ring 92 seals a gap between the outer peripheral surface of the first case 23 and the inner peripheral surface of the attachment hole 91 of the housing 9. With such an attachment structure, the drain valve 20 is disposed with the opening portion 23b of the first case 23 opening into the inside of the housing 9 and the discharge holes 24d of the second case 24 opening toward the outside of the housing 9.

Operation of the drain valve 20 will be described.

Figure 8:
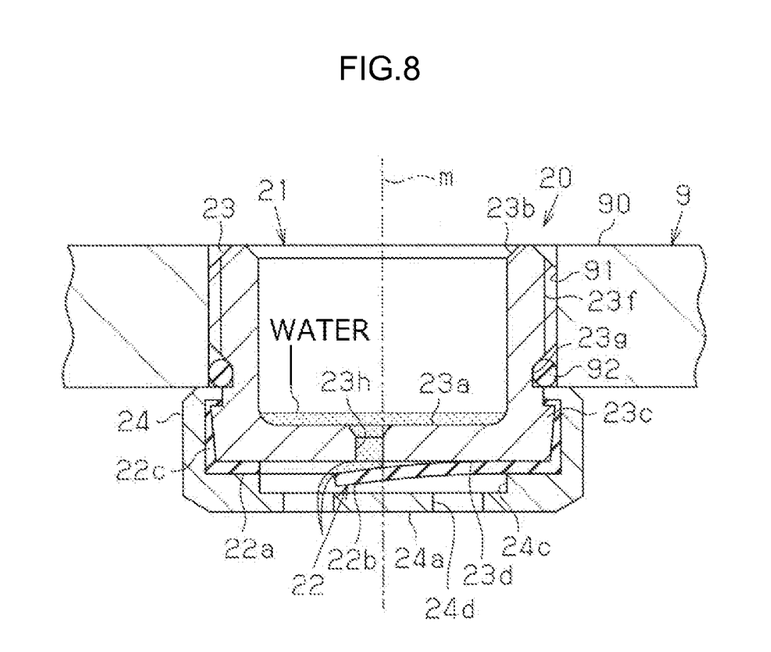
FIG. 8 is a sectional view illustrating an example of operation of the drain valve according to the embodiment.

When a stone thrown by a steered wheel during travel of the vehicle collides against the bellows 45 to damage the bellows 45, for example, water may flow into the housing 9 through the damaged portion as indicated by the long dashed double-short dashed lines in FIG. 1. When the water flows toward the bottom wall portion 90 of the housing 9 as indicated by the long dashed double-short dashed lines in FIG. 2, the water is discharged to the outside of the housing 9 via the drain valve 20. Specifically, as illustrated in FIG. 7, the water having moved to the bottom wall portion 90 of the housing 9 flows into the first case 23 through the opening portion 23b of the first case 23, and resides on the bottom portion 23a of the first case 23. The water residing on the bottom portion 23a of the first case 23 contacts the blocking piece 22b of the valve element 22 through the through hole 23h formed in the bottom portion 23a. Then, when a certain amount of water or more resides on the bottom portion 23a of the first case 23, the blocking piece 22b of the valve element 22 is elastically deformed by the weight of the water as illustrated in FIG. 8. Consequently, water inside the first case 23 flows into the second case 24 through a gap between the blocking piece 22b of the valve element 22 and the bottom surface 23d of the first case 23, and is discharged to the outside of the housing 9 through the discharge holes 24d of the second case 24. Thus, water having entered the housing 9 can be discharged to the outside.

In the case where water outside the housing 9 enters the second case 24 via the discharge holes 24d, the blocking piece 22b of the valve element 22 is pressed in the direction in which the blocking piece 22b closely contacts the bottom surface 23d of the first case 23. The blocking piece 22b of the valve element 22 is maintained in a state in which the blocking piece 22b closely contacts the bottom surface 23d of the first case 23. Therefore, entry of water into the housing 9 from the outside of the housing 9 via the drain valve 20 can be suppressed.

According to the steering device 1 described above, the following functions and advantageous effects described below in (1) to (5) can be obtained.

(1) The valve element 22 is fixed by holding the annular portion 22a of the valve element 22 between the bottom surface 23d of the first case 23 and the stepped portion 24c of the second case 24. Therefore, it is not necessary to provide the valve element and the cases with a structure for fixing the valve element as in the drain valve 100 according to the related art illustrated in FIG. 11. Therefore, it is possible to simplify the structure and reduce the cost.

(2) In the valve element 22, the blocking piece 22b is supported in a cantilever manner with the annular portion 22a held between the first case 23 and the second case 24, and a distal-end portion 22d which is a free end of the blocking piece 22b blocks the opening portion of the through hole 23h of the first case 23. Consequently, the blocking piece 22b is made elastically deformable easily by the weight of water that contacts the blocking piece 22b via the through hole 23h of the first case 23. Thus, water that resides inside the first case 23 is discharged easily.

(3) The blocking piece 22b is disposed to extend from a location on the inner peripheral surface of the annular portion 22a that is the most distant from the through hole 23h of the first case 23 to the opening portion of the through hole 23h. Consequently, the overall length of the blocking piece 22*b* can be increased, which makes the blocking piece 22*b* elastically deformable more easily. Thus, water that resides inside the first case 23 is discharged more easily.

(4) When the direction extending from a location at which the blocking piece 22*b* is supported in a cantilever manner toward the distal-end portion 22*d* is defined as the extending direction of the blocking piece 22*b* as illustrated in FIG. 6, the through hole 23*h* is formed as a long hole that extends in a direction that is orthogonal to the extending direction of the blocking piece 22*b*. Consequently, water that resides in the through hole 23*h* and the distal-end portion 22*d* of the blocking piece 22*b* contact each other over a large area, which causes the weight of the water to be applied to the distal-end portion 22*d* of the blocking piece 22*b* easily. This makes the blocking piece 22*b* elastically deformable easily, which causes water that resides inside the first case 23 to be discharged more easily.

(5) The tubular portion 22*c* of the valve element 22 is held between the outer peripheral surface of the first case 23 and the inner peripheral surface of the second case 24. Thus, the valve element 22 can seal a gap between the outer peripheral surface of the first case 23 and the inner peripheral surface of the second case 24. This suppresses entry of water through the gap.

The embodiment described above may also be implemented in the following forms.

The second case 24 may not be provided with the stepped portion 24*c*. Even in the case where the second case 24 is not provided with the stepped portion 24*c*, the valve element 22 can be fixed with the tubular portion 22*c* of the valve element 22 held between the outer peripheral surface of the first case 23 and the inner peripheral surface of the second case 24. In short, it is only necessary that the valve element 22 should be fixed with a part of the valve element 22 held between the first case 23 and the second case 24.

The arrangement and the shape of the blocking piece 22*b* may be changed as appropriate. For example, the blocking piece 22*b* may be disposed to extend from a location on the inner peripheral surface of the annular portion 22*a* that is the most proximate to the through hole 23*h* of the first case 23 to the opening portion of the through hole 23*h*.

The shape of the valve element 22 may be changed as appropriate as long as the opening portion of the through hole 23*h* of the first case 23 can be blocked. For example, the valve element 22 may be formed from the annular portion 22*a* and the blocking piece 22*b* only, or the valve element 22 may be formed from the blocking piece 22*b* only. In the case where the valve element 22 is formed from the blocking piece 22*b* only, the valve element 22 can be fixed with an end portion of the blocking piece 22*b* that is opposite from the distal-end portion 22*d* held between the bottom surface 23*d* of the first case 23 and the stepped portion 24*c* of the second case 24.

Figure 9:
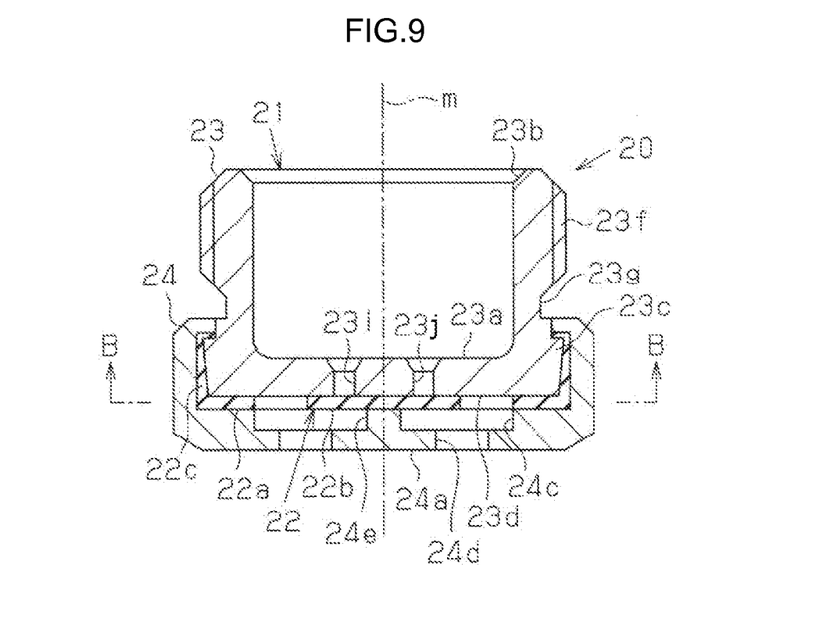
FIG. 9 is a sectional view illustrating a sectional structure of a drain valve of a steering device according to a modification.
Figure 10:
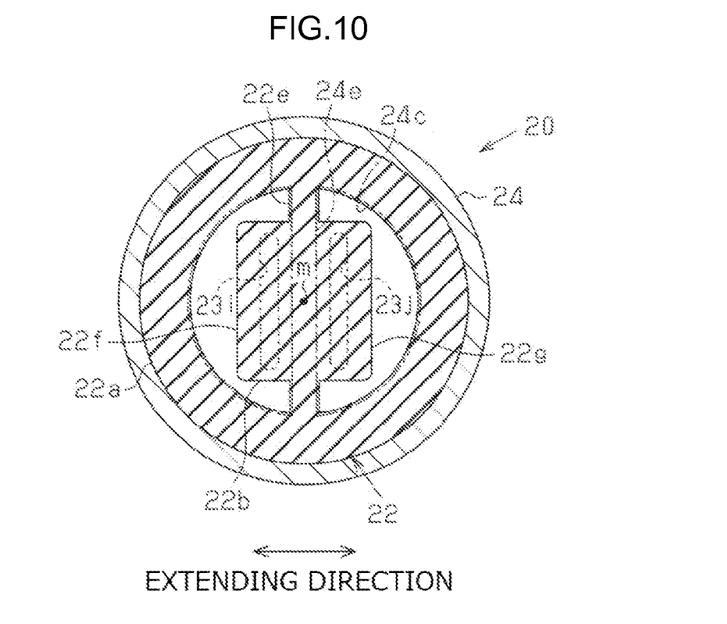
FIG. 10 is a cross-sectional view illustrating a cross-sectional structure taken along the line B-B of FIG. 9.

A shape illustrated in FIGS. 9 and 10, for example, may be adopted for the valve element 22. In a drain valve 20 according to a modification, as illustrated in FIG. 9, a pair of through holes 23*i*, 23*j* are disposed in the bottom portion 23*a* of the first case 23 symmetrically with respect to the center axis m of the first case 23. As illustrated in FIG. 10, the valve element 22 includes a rectangular blocking piece 22*b* coupled to the annular portion 22*a* via a pair of bridge portions 22*e*. As illustrated in FIGS. 9 and 10, a projecting portion 24*e* that extends along the bridge portions 22*e* and the blocking piece 22*b* of the valve element is formed at the center portion of the inner surface of the bottom portion 24*a* of the second case 24. The center portion of the blocking piece 22*b* is held between the projecting portion 24*e* of the second case 24 and the bottom surface 23*d* of the first case 23 at an intermediate position between the respective opening portions of the pair of through holes 23*i*, 23*j*. Both end portions 22*f*, 22*g* which are free ends of the blocking piece 22*b* block the respective opening portions of the through holes 23*i*, 23*j*. According to such a configuration, the two through holes 23*i*, 23*j* are formed in the bottom portion 23*a* of the first case 23, which causes water that resides inside the first case 23 to flow into the second case 24 easily. Thus, water that resides inside the first case 23 is discharged more easily.

The shape of the through holes 23*h*, 23*i*, 23*j* is not limited to a long hole, and may be a circular hole, a rectangular hole, or the like, for example. In the case where the through holes 23*h*, 23*i*, 23*j* are circular holes or rectangular holes, the same effect as in the case where the through holes 23*h*, 23*i*, 23*j* are long holes can be obtained if a plurality of the through holes 23*h*, 23*i*, 23*j* are arranged in a direction that is orthogonal to the extending direction of the blocking piece 22*b*.

The position of the through hole 23*h* in the bottom portion 23*a* of the first case 23 may be changed as appropriate. For example, the through hole 23*h* may be provided in the center portion of the bottom portion 23*a* of the first case 23.

The shape of the first case 23 and the second case 24 is not limited to a bottomed cylindrical shape, and any shape such as a bottomed quadrilateral tubular shape, for example, may be adopted.

The configuration of the steering device 1 according to the embodiment is not limited to a rack-parallel electric power steering device, and may also be applied to various steering devices such as a rack-coaxial electric power steering device, a dual-pinion electric power steering device, and a steer-by-wire steering device, for example. The configuration of the steering device according to the embodiment may be applied to steering devices including: a steered shaft that moves in the axial direction on the basis of rotation of a steering shaft to steer steered wheels; a motor that applies an assist force to the steered shaft via a speed reducer; and a housing that covers the periphery of the speed reducer.

What is claimed is:
1. A steering device comprising:
a steered shaft that moves in an axial direction on the basis of rotation of a steering shaft to steer steered wheels;
a motor that applies an assist force to the steered shaft via a speed reducer; and
a housing that covers a periphery of the speed reducer, wherein
a drain valve is provided at a bottom wall portion of the housing under the speed reducer in a vertical direction, and
the drain valve comprises:
a first case that opens into the housing and that has a bottomed cylindrical shape having a bottom portion in which a through hole is formed;
a second case that is mounted to an outer peripheral portion of the bottom portion of the first case and that has a bottomed cylindrical shape having a bottom portion which is disposed with a gap from the bottom portion of the first case and in which a discharge hole is formed; and
a valve element formed of an elastic member that closely contacts a bottom surface of the first case to block an opening portion of the through hole and that is held between the first case and the second case by having a top surface of the valve element contact the bottom surface of the first case and a bottom surface of the valve element contact a top surface of the second case.

2. The steering device according to claim 1, wherein the valve element includes a blocking piece supported in a cantilever manner with a portion held between the first case and the second case, and a distal-end portion which is a free end of the blocking piece blocks the opening portion of the through hole.

3. The steering device according to claim 2, wherein the through hole is formed in the bottom portion of the first case at a position offset from a center of the bottom portion, the valve element is held between the first case and the second case at a portion of a peripheral edge portion of a bottom surface of the first case, which is the most distant from the through hole, and the blocking piece is disposed to extend from the portion of the valve element held between the first case and the second case to the opening portion of the through hole.

4. The steering device according to claim 2, wherein when a direction extending from the portion of the blocking piece supported in a cantilever manner to the distal-end portion is defined as an extending direction of the blocking piece, the through hole is a long hole that extends in a direction that is orthogonal to the extending direction of the blocking piece.

5. The steering device according to claim 1, wherein:
a pair of the through holes formed in the bottom portion of the first case; and the valve element includes a blocking piece, a center portion of which is held between the first case and the second case at an intermediate position between respective opening portions of the through holes, and both end portions of the blocking piece which are free ends of the blocking piece block the respective opening portions of the through holes.

6. The steering device according to claim 5, wherein when a direction extending from a portion of the blocking piece held between the first case and the second case to the both end portions is defined as an extending direction of the blocking piece, the through holes are long holes that extend in a direction that is orthogonal to the extending direction of the blocking piece.

7. The steering device according to claim 1, wherein the valve element is held between an outer peripheral surface of the first case and an inner peripheral surface of the second case.

8. The steering device according to claim 1, wherein the valve element includes:
   an annular portion disposed along a peripheral edge of the bottom surface of the first case, with the annular portion held between the first case and the second case by having a top surface of the annular portion contact the bottom surface of the first case and a bottom surface of the annular portion contact the top surface of the second case, and
   a blocking piece formed to extend from an inner peripheral surface of the annular portion, the blocking piece formed to extend from a location on the inner peripheral surface of the annular portion that is the most distant from the through hole of the first case to the through hole in order to block the opening portion of the through hole.

9. The steering device according to claim 8, wherein the valve element further includes a tubular portion formed in a tubular shape at an outer edge of the annular portion, the tubular portion disposed along an outer peripheral surface of a flange portion of the first case and a notch of the flange portion, and held between an outer peripheral surface of the first case and an inner peripheral surface of the second case by having the tubular portion contact both the outer peripheral surface of the first case and the inner peripheral surface of the second case.

* * * * *